(12) United States Patent
Ma et al.

(10) Patent No.: US 11,728,931 B2
(45) Date of Patent: Aug. 15, 2023

(54) COMMUNICATION METHOD, NETWORK DEVICE, AND TERMINAL

(71) Applicant: Huawei Technologies Co., Ltd., Shenzhen (CN)

(72) Inventors: Ruixiang Ma, Shenzhen (CN); Yongxia Lyu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/741,032

(22) Filed: May 10, 2022

(65) Prior Publication Data
US 2022/0271865 A1 Aug. 25, 2022

Related U.S. Application Data

(63) Continuation of application No. 16/709,797, filed on Dec. 10, 2019, now Pat. No. 11,356,204, which is a (Continued)

(30) Foreign Application Priority Data
Jun. 14, 2017 (CN) .......................... 201710448527.4

(51) Int. Cl.
H04L 1/18 (2023.01)
H04L 5/00 (2006.01)
(Continued)

(52) U.S. Cl.
CPC .......... *H04L 1/0643* (2013.01); *H04L 1/0675* (2013.01); *H04L 1/1819* (2013.01); *H04L 1/1896* (2013.01)

(58) Field of Classification Search
CPC .............. H04B 7/2643; H04W 72/042; H04W 72/0446; H04W 72/0453; H04W 8/24;
(Continued)

(56) References Cited

U.S. PATENT DOCUMENTS 9,602,263 B2  3/2017 Lee et al.
10,757,637 B2  8/2020 Harada et al.
(Continued)

FOREIGN PATENT DOCUMENTS

CN  101247552 A  8/2008
CN  103313378 A  9/2013
(Continued)

OTHER PUBLICATIONS

3GPP TS 38.212 V0.0.0 (May 2017); 3rd Generation Partnership Project;Technical Specification Group Radio Access Network; NR; Multiplexing and channel coding (Release 15); 10 pages.
(Continued)

Primary Examiner — Kent Krueger
(74) Attorney, Agent, or Firm — Slater Matsil, LLP

(57) ABSTRACT

This application provides a communication method and apparatus. A terminal receives from a network device, first indication information indicating N sets of information of feedback time, each of the N sets comprises at least one piece of information of feedback time, each of the at least one piece of information of feedback time indicates a quantity of time units comprised in a feedback time of a data block. The terminal receives downlink control information (DCI) from the network device, wherein the DCI comprises second indication information indicating first information of feedback time of the data block, and the first information of feedback time belongs to a first set of information of feedback time, and the first set is one of the N sets. The terminal sends the response message for the data block to the network device based on the second indication information and the first indication information.

20 Claims, 4 Drawing Sheets

Related U.S. Application Data continuation of application No. PCT/CN2018/091273, filed on Jun. 14, 2018.

(51) Int. Cl.
| | | |
|---|---|---|
| *H04W 72/04* | (2023.01) | |
| *H04L 1/06* | (2006.01) | |
| *H04L 1/1812* | (2023.01) | |
| *H04L 1/1867* | (2023.01) | |

(58) Field of Classification Search
CPC .... H04W 80/08; H04L 5/0082; H04L 5/0055; H04L 5/1469; H04L 1/1607; H04L 1/1812; H04L 1/1854; H04L 1/1864
See application file for complete search history.

(56) References Cited

U.S. PATENT DOCUMENTS

| | | | |
|---|---|---|---|
| 10,771,224 | B2 | 9/2020 | Gao et al. |
| 2015/0009972 | A1 | 1/2015 | Xu et al. |
| 2015/0085796 | A1 | 3/2015 | Xu et al. |
| 2017/0373802 | A1 | 12/2017 | Bergstrom et al. |
| 2018/0070369 | A1 | 3/2018 | Papasakellariou |
| 2018/0279229 | A1 | 9/2018 | Dinan et al. |
| 2018/0324853 | A1 | 11/2018 | Jeon et al. |
| 2018/0367255 | A1 | 12/2018 | Jeon et al. |
| 2018/0367278 | A1 | 12/2018 | Chatterjee et al. |
| 2019/0037561 | A1 | 1/2019 | Jung et al. |
| 2019/0037586 | A1 | 1/2019 | Park et al. |
| 2019/0165894 | A1 | 5/2019 | Choi et al. |
| 2019/0239214 | A1 | 8/2019 | Yang et al. |
| 2019/0268803 | A1 | 8/2019 | He et al. |
| 2019/0363840 | A1 | 11/2019 | Wang et al. |
| 2019/0363842 | A1 | 11/2019 | Fu et al. |
| 2019/0364557 | A1 | 11/2019 | Harada et al. |
| 2019/0372721 | A1 | 12/2019 | Lee et al. |
| 2020/0022175 | A1 | 1/2020 | Xiong et al. |
| 2020/0037350 | A1 | 1/2020 | Park et al. |
| 2020/0128578 | A1* | 4/2020 | Park .................. H04W 72/0446 |
| 2020/0236709 | A1 | 7/2020 | Park et al. |

FOREIGN PATENT DOCUMENTS

| | | |
|---|---|---|
| CN | 103368706 A | 10/2013 |
| CN | 104348602 A | 2/2015 |
| CN | 106301699 A | 1/2017 |
| CN | 107231217 B | 8/2020 |
| EP | 3531757 A1 | 8/2019 |
| JP | 2019522423 A | 8/2019 |
| RU | 2518966 C1 | 6/2014 |
| RU | 2619064 C2 | 5/2017 |
| WO | 2017038741 A1 | 3/2017 |

OTHER PUBLICATIONS

3GPP TS 38.331 V0.0.3 (May 2017);3rd Generation Partnership Project;Technical Specification Group Radio Access Network; NR;Radio Resource Control (RRC); Protocol specification (Release 15); 20 pages.

Huawei Hisilicon: "Discussion on timing relations and signaling of HARQ timing for NR", 3GPP Draft; R1-1611218,Nov. 13, 2016 (Nov. 13, 2016), 4 pages.

3GPP TSG RAN WG1 Meeting #88, R1-1702152: Remaining details of HARQ-ACK bundling Intel Corporation Athens, Greece Feb. 13-17, 2017, 8 pages.

ZTE et al: "NR HARQ timing indication scheme", 3GPP Draft; R1-1704378, Apr. 2, 2017 (Apr. 2, 2017), 4 pages.

Huawei et al: "HARQ feedback timing for NR".3GPP Draft; R1-1706961, May 14, 2017 (May 14, 2017), 3 pages.

Samsung, "HARQ-ACK Feedback Timing", 3GPP TSG RAN WG1 #89, R1-1708026, May 15-19, 2017, 3 pages, Hangzhou, China.

3GPP TSG-RAN WG1 #89, R1-1709087: On PUCCH resource allocation, Ericsson, Hangzhou, China, May 15-19, 2017, 3 pages.

3GPP TSG-RAN WG2 NR Ad Hoc, R2-1700409:HARQ Feedback Transmission Schemes for NR, Ericsson, Spokane, USA, Jan. 17-19, 2017, 4 pages.

LG Electronics, "Discussion on HARQ timing and resource for NR", 3GPP TSG RAN WG1 NR-AdHoc Meeting, R1-1700508, Jan. 16-20, 2017, 8 pages, Spokane, USA.

LG Electronics, "Discussion on HARQ timing and resource for NR", 3GPP TSG RAN WG1 NR-AdHoc Meeting , R1-1700508, Spokane, WA, US, Jan. 16-20, 2017, 7 pages.

\* cited by examiner

COMMUNICATION METHOD, NETWORK DEVICE, AND TERMINAL

CROSS-REFERENCE TO RELATED APPLICATIONS

This application is a continuation of U.S. patent application Ser. No. 16/709,797, filed on Dec. 10, 2019, which is a continuation of International Application No. PCT/CN2018/091273, filed on Jun. 14, 2018. The International Application claims priority to Chinese Patent Application No. 201710448527.4, filed on Jun. 14, 2017. All of the aforementioned patent applications are hereby incorporated by reference in their entireties.

TECHNICAL FIELD

This application relates to the communications field, and more specifically, to a communication method, a network device, and a terminal.

BACKGROUND

In a communications system, after receiving downlink data carried in a physical downlink shared channel (PDSCH), user equipment feeds back a hybrid automatic repeat request (HARQ) response message to a network device based on a data decoding result, for example, an acknowledgment (ACK) message indicating that the downlink data is successfully received or a negative acknowledgment (NACK) message indicating that the downlink data fails to be received.

In general cases, a time at which the user equipment receives the downlink data and a time at which the user equipment sends the HARQ response message to the network device meet the following relationship: $n+k_1$. Herein, n is a sequence number of a transmission time unit in which the user equipment receives the downlink data, and $k_1$ is a quantity of transmission time units between the time at which the user equipment sends the HARQ response message to the network device and the time at which the user equipment receives the downlink data. To be specific, the user equipment sends the HARQ response message for the downlink data after $k_1$ transmission time units by using, as a start point, the time at which the downlink data is received.

For example, in a long term evolution (LTE) system, $k_1$ is 4, and the transmission time unit is a subframe. Specifically, in the LTE system, the user equipment sends the HARQ response message for the downlink data after four subframes by using, as a start point, a subframe in which the downlink data is received.

However, in a new radio (NR) communications system such as a 5G communications system, a basic transmission time may vary from one symbol to a plurality of slots. If the foregoing general communication method is used in all scenarios to feed back the HARQ response message, in some scenarios, the HARQ response message cannot be transmitted, and consequently communication reliability is affected.

For example, the network device first sends, to the user equipment, a transport block (TB) whose transmission time is four slots, and then sends, to the user equipment, a TB whose transmission time is two symbols.

If HARQ response messages for the two TBs are fed back according to the foregoing communication method, and $k_1$ is equal to 3, a feedback start time of the latter TB is the sixth symbol after the TB is received.

However, a decoding time of the former TB exceeds six symbols. To be specific, at a time of the sixth symbol after the user equipment receives the latter TB, the user equipment has not completed decoding on the former TB, and therefore cannot decode the latter TB that needs to be sequentially decoded. Consequently, the user equipment cannot transmit the HARQ response message for the latter TB in the sixth symbol after the user equipment receives the latter TB.

SUMMARY

This application provides a communication method, a network device, and a terminal, to help improve communication reliability.

According to a first aspect, this application provides a communication method. The communication method includes: sending first indication information to a terminal, where the first indication information is used to indicate N sets of related information of feedback time, each of the N sets of related information of feedback time includes at least one piece of related information of feedback time, each piece of related information of feedback time is used to indicate a quantity of time units included in a feedback time of a data block, the feedback time of the data block includes a time difference between a sending time of a response message for the data block and a receiving time of the data block, and N is an integer greater than 1; sending second indication information to the terminal, where the second indication information is used to indicate first related information of feedback time of a first data block, the first related information of feedback time belongs to a first set of related information of feedback time, and the first set of related information of feedback time is one of the N sets of related information of feedback time; and receiving a response message that is for the first data block and that is sent by the terminal based on the first indication information and the second indication information.

In this communication method, the network device sends the second indication information to the terminal, to indicate the first related information of feedback time of the first data block in the first set of related information of feedback time, so that the terminal can determine the first related information of feedback time based on the second indication information, and send the response message for the first data block based on the first related information of feedback time, and the network device determines, based on the response message, whether retransmission needs to be performed, thereby improving communication reliability.

Optionally, the first indication information may be higher layer configuration information, and the first indication information may include the N sets of related information of feedback time.

Optionally, the foregoing response message may be a HARQ response message.

Optionally, the second indication information may include a location of the first related information of feedback time in the first set of related information of feedback time, so that the terminal can obtain the first related information of feedback time of the first data block from the first set of related information of feedback time based on the second indication information.

In this case, the first set of related information of feedback time is any one of the N sets of related information of feedback time. In other words, all possible related information of feedback time may be grouped into the N sets of related information of feedback time. Therefore, when indicating the location of the first related information of feedback time, the second indication information indicates only the location of the first related information of feedback time in the first set of related information of feedback time. In comparison with a method in which all possible feedback times are indicated, fewer bits can be used in the second indication information. This can reduce communication overheads of the second indication information, thereby improving communication efficiency.

It should be noted that the location of the first related information of feedback time of the first data block in the first set of related information of feedback time may also be understood as an index of the first related information of feedback time of the first data block in the first set of related information of feedback time.

With reference to the first aspect, in a first possible implementation, in the N sets of related information of feedback time, related information of feedback time in different sets of related information of feedback time corresponds to a same time unit. This can reduce complexity of communication between the network device and the terminal.

With reference to the first possible implementation, in a second possible implementation, the time unit corresponding to the related information of feedback time in the sets of related information of feedback time is preconfigured.

To be specific, the time units included in the feedback times indicated by the related information of feedback time in the different sets of related information of feedback time may be the same, but also be a fixed time unit preconfigured in a system or a fixed time unit predefined in a protocol. This can further reduce the complexity of the communication between the network device and the terminal.

With reference to the first possible implementation, in a third possible implementation, a length of the time unit corresponding to the related information of feedback time in the sets of related information of feedback time is equal to a transmission time length of the first data block.

To be specific, the time unit included in the feedback time indicated by the related information of feedback time in the different sets of related information of feedback time may be a transmission time length of a current data block (namely, the first data block). If the transmission time length of the current data block is different, the time unit included in the feedback time indicated by the related information of feedback time may be different. In this way, both communication complexity and communication flexibility can be considered.

With reference to the first aspect, in a fourth possible implementation, in the N sets of related information of feedback time, related information of feedback time in different sets of related information of feedback time corresponds to different time units. This can improve communication flexibility.

With reference to the first aspect, in a fifth possible implementation, a time unit corresponding to the related information of feedback time in the set of related information of feedback time is a time unit occupied by an uplink control channel corresponding to the first data block. This can improve communication flexibility.

With reference to any one of the first aspect or the foregoing possible implementations, in a sixth possible implementation, the communication method further includes: sending third indication information to the terminal, where the third indication information is used to indicate the first set of related information of feedback time in the N sets of related information of feedback time.

To be specific, the third indication information is sent to the terminal to indicate which one of the N sets of related information of feedback time is the first set of related information of feedback time to which the first related information of feedback time indicated by the second indication information belongs, so that the terminal can determine the first set of related information of feedback time without depending on other information, such as scenario information. This can reduce complexity of the terminal.

According to a second aspect, this application provides a communication method. The communication method includes: receiving first indication information sent by a network device, where the first indication information is used to indicate N sets of related information of feedback time, each of the N sets of related information of feedback time includes at least one piece of related information of feedback time, the related information of feedback time is used to indicate a quantity of time units included in a feedback time of a data block, the feedback time of the data block includes a time difference between a sending time of a response message for the data block and a receiving time of the data block, and N is an integer greater than 1; receiving second indication information sent by the network device, where the second indication information is used to indicate first related information of feedback time of a first data block, the first related information of feedback time belongs to a first set of related information of feedback time, and the first set of related information of feedback time is one of the N sets of related information of feedback time; and sending a response message for the first data block to the network device based on the first indication information and the second indication information.

In the communication method, after receiving the second indication information sent by the network device, the terminal may determine the first related information of feedback time of the first data block based on the second indication information, so that the terminal can send the response message for the first data block to the network device. This can improve communication reliability.

Optionally, the first indication information is higher layer configuration information, and the first indication information may include the N sets of related information of feedback time.

Optionally, the foregoing response message may be a HARQ response message.

Optionally, the second indication information may include a location of the first related information of feedback time in the first set of related information of feedback time. In this way, the terminal can obtain the first related information of feedback time of the first data block from the first set of related information of feedback time based on the second indication information.

In this case, the first set of related information of feedback time is any one of the N sets of related information of feedback time. In other words, all possible related information of feedback time may be grouped into the N sets of related information of feedback time. Therefore, when indicating the location of the first related information of feedback time, the second indication information indicates only the location of the first related information of feedback time in the first set of related information of feedback time. In comparison with a method in which all possible feedback times are indicated, fewer bits can be used in the second indication information. This can reduce communication overheads of the second indication information, thereby improving communication efficiency.

It should be noted that the location of the first related information of feedback time of the first data block in the first set of related information of feedback time may also be understood as an index of the first related information of feedback time of the first data block in the first set of related information of feedback time.

With reference to the second aspect, in a first possible implementation, in the N sets of related information of feedback time, related information of feedback time in different sets of related information of feedback time corresponds to a same time unit. This can reduce complexity of communication between the network device and the terminal.

With reference to the first possible implementation, in a second possible implementation, the time unit corresponding to the related information of feedback time in the sets of related information of feedback time is preconfigured.

To be specific, the time units included in the feedback times indicated by the related information of feedback time in the different sets of related information of feedback time may not only be the same, but also be a fixed time unit preconfigured in a system or a fixed time unit specified in a protocol. This can further reduce the complexity of the communication between the network device and the terminal.

With reference to the first possible implementation, in a third possible implementation, a length of the time unit corresponding to the related information of feedback time in the set of related information of feedback time is equal to a transmission time length of the first data block.

To be specific, the time unit included in the feedback time indicated by the related information of feedback time in the different sets of related information of feedback time may be a transmission time length of a current data block (namely, the first data block). If the transmission time length of the current data block is different, the time unit included in the feedback time indicated by the related information of feedback time may be different. In this way, both communication complexity and communication flexibility can be considered.

With reference to the second aspect, in a fourth possible implementation, in the N sets of related information of feedback time, related information of feedback time in different sets of related information of feedback time corresponds to different time units. This can improve communication flexibility.

With reference to the second aspect, in a fifth possible implementation, a time unit corresponding to the related information of feedback time in the set of related information of feedback time is a time unit occupied by an uplink control channel corresponding to the first data block. This can improve communication flexibility.

With reference to any one of the second aspect or the foregoing possible implementations, in a sixth possible implementation, the communication method further includes: receiving third indication information sent by the network device, where the third indication information is used to indicate the first set of related information of feedback time in the N sets of related information of feedback time.

According to a third aspect, this application provides a network device. The network device includes modules configured to perform the communication method in any one of the first aspect or the possible implementations of the first aspect.

According to a fourth aspect, this application provides a terminal. The terminal includes modules configured to perform the communication method in any one of the second aspect or the possible implementations of the second aspect.

According to a fifth aspect, this application provides a network device. The network device includes a processor, a transmitter, and a receiver. The processor is configured to execute program code. When the processor executes the program code, the processor, the transmitter, and the receiver implement the communication method in any one of the first aspect or the possible implementations of the first aspect.

Optionally, the network device may further include a memory, and the memory is configured to store the code executed by the processor.

According to a sixth aspect, this application provides a terminal. The terminal includes a processor, a receiver, and a transmitter. The processor is configured to execute program code. When the processor executes the program code, the processor, the receiver, and the transmitter implement the communication method in any one of the second aspect or the possible implementations of the second aspect.

Optionally, the terminal may further include a memory, and the memory is configured to store the program code executed by the processor.

According to a seventh aspect, this application provides a computer-readable storage medium. The computer-readable storage medium stores program code to be executed by a network device. The program code includes an instruction used to perform the communication method in any one of the first aspect or the possible implementations of the first aspect.

According to an eighth aspect, this application provides a computer-readable storage medium. The computer-readable storage medium stores program code to be executed by a terminal. The program code includes an instruction used to perform the communication method in any one of the second aspect or the possible implementations of the second aspect.

According to a ninth aspect, this application provides a computer program product that includes an instruction. When the computer program product runs on a network device, the network device is enabled to perform the communication method in any one of the first aspect or the possible implementations of the first aspect.

According to a tenth aspect, this application provides a computer program product that includes an instruction. When the computer program product runs on a terminal, the terminal is enabled to perform the communication method in any one of the second aspect or the possible implementations of the second aspect.

According to an eleventh aspect, this application provides a communication method. The communication method includes: sending first indication information to a first terminal, where the first indication information is used to indicate a first set of related information of feedback time, the first set of related information of feedback time includes at least one piece of related information of feedback time, each piece of related information of feedback time is used to indicate a quantity of time units included in a feedback time of a first data block, and the feedback time of the first data block includes a time difference between a sending time of a response message for the first data block and a receiving time of the first data block; sending second indication information to the first terminal, where the second indication information is used to indicate first related information of feedback time of the first data block, and the first related information of feedback time belongs to the first set of related information of feedback time; and receiving the response message that is for the first data block and that is sent by the first terminal based on the first indication information and the second indication information.

According to the communication method, the first terminal can determine, based on the first indication information and the second indication information, the time for sending the response message, so that communication reliability can be improved.

Optionally, the foregoing response message may be a HARQ response message.

Optionally, the second indication information is carried in downlink control information DCI, and a quantity of bits included in the second indication information may be determined based on a size of the first set of related information of feedback time.

With reference to the eleventh aspect, in a first possible implementation, the time unit included in the feedback time of the first data block is determined based on a transmission time length of the first data block. Because the time unit included in the feedback time of the first data block is determined based on the transmission time length of the first data block, feedback times of data blocks with different transmission time lengths may be indicated by using same related information of feedback time, so that the feedback times of the data blocks with different transmission time lengths may be determined by using a same set of related information of feedback time. This can reduce a quantity of to-be-transmitted sets of related information of feedback time, helping reduce transmission overheads and complexity of the first indication information. From another perspective, this can reduce a total quantity of pieces of related information of feedback time, thereby helping reduce transmission overheads of the second indication information. In conclusion, communication efficiency can be improved.

Optionally, when a transmission time length of a second data block prior to the first data block is greater than the transmission time length of the first data block, a length of the time unit included in the feedback time corresponding to the first related information of feedback time may be the transmission time length of the second data block.

Alternatively, when a transmission time length of a second data block prior to the first data block is less than or equal to the transmission time length of the first data block, a length of the time unit included in the feedback time corresponding to the first related information of feedback time may be the transmission time length of the first data block.

It should be understood that herein, that the second data block is prior to the first data block may mean that a transmission time of the second data block is before that of the first data block, and more specifically, may mean that the transmission time of the second data block is before that of the first data block, and an interval between the transmission time of the second data block and that of the first data block is less than or is less than or equal to a specific time range, so that the response message for the first data block cannot be sent by using the transmission time length of the first data block as a time unit.

Alternatively, when an interval between the transmission time of the first data block and that of the second data block is greater than or is greater than or equal to a specific time range, a length of the time unit included in the feedback time corresponding to the first related information of feedback time may be the transmission time length of the first data block.

It should be understood that in this case, the response message for the first data block and that of the second data block do not affect each other.

With reference to the eleventh aspect, in a second possible implementation, the time unit included in the feedback time of the first data block is preconfigured.

To be specific, the time unit included in the feedback time of the data block may be a fixed time unit preconfigured in a system or a fixed time unit predefined in a protocol. This can further reduce complexity of communication between the network device and the terminal.

With reference to the eleventh aspect, in a third possible implementation, a time unit included in a feedback time corresponding to the first related information of feedback time is a time unit occupied by an uplink control channel corresponding to the first data block. This can improve communication flexibility.

With reference to the eleventh aspect, in a fourth possible implementation, the communication method further includes: sending third indication information to a second terminal, where the third indication information is used to indicate a second set of related information of feedback time, the second set of related information of feedback time includes at least one piece of related information of feedback time, each piece of related information of feedback time is used to indicate a quantity of time units included in a feedback time of a third data block, and the feedback time of the third data block includes a time difference between a sending time of a response message for the third data block and a receiving time of the third data block; sending fourth indication information to the second terminal, where the fourth indication information is used to indicate second related information of feedback time of the third data block, and the second related information of feedback time belongs to the second set of related information of feedback time; and receiving the response message that is for the third data block and that is sent by the second terminal based on the third indication information and the fourth indication information.

Optionally, the first set of related information of feedback time is different from the second set of related information of feedback time. Specifically, the size of the first set of related information of feedback time is different from a size of the second set of related information of feedback time. In this case, a quantity of bits used in the second indication information is different from a quantity of bits used in the fourth indication information.

Optionally, the size of the first set of related information of feedback time is the same as a size of the second set of related information of feedback time, and at least one element in the first set of related information of feedback time is different from at least one element in the second set of related information of feedback time. In this case, a quantity of bits used in the second indication information is the same as a quantity of bits used in the fourth indication information.

According to a twelfth aspect, this application provides a communication method. The communication method includes: receiving first indication information sent by a network device, where the first indication information is used to indicate a first set of related information of feedback time, the first set of related information of feedback time includes at least one piece of related information of feedback time, the related information of feedback time is used to indicate a quantity of time units included in a feedback time of a first data block, and the feedback time of the first data block includes a time difference between a sending time of a response message for the first data block and a receiving time of the first data block; receiving second indication information sent by the network device, where the second indication information is used to indicate first related information of feedback time of the first data block, and the first related information of feedback time belongs to the first set of related information of feedback time; and sending a response message for the first data block to the network device based on the second indication information.

According to the communication method, a terminal can determine, based on the first indication information and the second indication information, the time for sending the response message, so that communication reliability can be improved.

Optionally, the foregoing response message may be a HARQ response message.

Optionally, a quantity of bits included in the second indication information may be determined based on a size of the first set of related information of feedback time.

With reference to the twelfth aspect, in a first possible implementation, the time unit included in the feedback time of the data block is determined based on a transmission time length of the data block. Because the time unit included in the feedback time of the data block is determined based on the transmission time length of the data block, feedback times of data blocks with different transmission time lengths may be indicated by using same related information of feedback time, so that the feedback times of the data blocks with different transmission time lengths may be determined by using a same set of related information of feedback time. This can reduce a quantity of to-be-transmitted sets of related information of feedback time, helping reduce transmission overheads and complexity of the first indication information. From another perspective, this can reduce a total quantity of pieces of related information of feedback time, thereby helping reduce transmission overheads of the second indication information. In conclusion, communication efficiency can be improved.

Optionally, when a transmission time length of a second data block prior to the first data block is greater than the transmission time length of the first data block, a length of a time unit included in a feedback time corresponding to the first related information of feedback time may be the transmission time length of the second data block.

Alternatively, when a transmission time length of a second data block prior to the first data block is less than or equal to the transmission time length of the first data block, a length of the time unit included in the feedback time corresponding to the first related information of feedback time may be the transmission time length of the first data block.

It should be understood that herein, that the second data block is prior to the first data block may mean that a transmission time of the second data block is before that of the first data block, and more specifically, may mean that the transmission time of the second data block is before that of the first data block, and an interval between the transmission time of the second data block and that of the first data block is less than or is less than or equal to a specific time range, so that the response message for the first data block cannot be sent by using the transmission time length of the first data block as a time unit.

Alternatively, when an interval between the transmission time of the first data block and that of the second data block is greater than or is greater than or equal to a specific time range, a length of the time unit included in the feedback time corresponding to the first related information of feedback time may be the transmission time length of the first data block.

It should be understood that in this case, the response message for the first data block and that of the second data block do not affect each other.

With reference to the twelfth aspect, in a second possible implementation, the time unit included in the feedback time of the data block is preconfigured.

To be specific, the time unit included in the feedback time of the data block may be a fixed time unit preconfigured in a system or a fixed time unit predefined in a protocol. This can further reduce complexity of communication between the network device and the terminal.

With reference to the twelfth aspect, in a third possible implementation, a time unit included in a feedback time corresponding to the related information of feedback time is a time unit occupied by an uplink control channel corresponding to the data block. This can improve communication flexibility.

With reference to the twelfth aspect, in a fourth possible implementation, the first set of related information of feedback time is different from a second set of related information of feedback time, and the second set of related information of feedback time is a set of related information of feedback time of a second terminal.

With reference to the fourth possible implementation, in a fifth possible implementation, the size of the first set of related information of feedback time is different from a size of the second set of related information of feedback time, a quantity of bits used in the second indication information is different from a quantity of bits used in the fourth indication information, and the fourth indication information indicates second related information of feedback time of the second terminal in the second set of related information of feedback time.

With reference to the fourth possible implementation, in a sixth possible implementation, the size of the first set of related information of feedback time is the same as a size of the second set of related information of feedback time, at least one element in the first set of related information of feedback time is different from at least one element in the second set of related information of feedback time, and a quantity of bits used in the second indication information is the same as a quantity of bits used in the fourth indication information.

According to a thirteenth aspect, this application provides a network device. The network device includes modules configured to perform the communication method in any one of the eleventh aspect or the possible implementations of the eleventh aspect.

According to a fourteenth aspect, this application provides a terminal. The terminal includes modules configured to perform the communication method in any one of the twelfth aspect or the possible implementations of the twelfth aspect.

According to a fifteenth aspect, this application provides a network device. The network device includes a processor, a transmitter, and a receiver. The processor is configured to execute program code. When the processor executes the program code, the processor, the transmitter, and the receiver implement the communication method in any one of the eleventh aspect or the possible implementations of the eleventh aspect.

Optionally, the network device may further include a memory, and the memory is configured to store the program code executed by the processor.

According to a sixteenth aspect, this application provides a terminal. The terminal includes a processor, a receiver, and a transmitter. The processor is configured to execute program code. When the processor executes the program code, the processor, the receiver, and the transmitter implement the communication method in any one of the twelfth aspect or the possible implementations of the twelfth aspect.

Optionally, the terminal may further include a memory, and the memory is configured to store the program code executed by the processor.

According to a seventeenth aspect, this application provides a computer-readable storage medium. The computer-readable storage medium stores program code to be executed by a network device. The program code includes an instruction used to perform the communication method in any one of the eleventh aspect or the possible implementations of the eleventh aspect.

According to an eighteenth aspect, this application provides a computer-readable storage medium. The computer-readable storage medium stores program code to be executed by a terminal. The program code includes an instruction used to perform the communication method in any one of the twelfth aspect or the possible implementations of the twelfth aspect.

According to a nineteenth aspect, this application provides a computer program product that includes an instruction. When the computer program product runs on a network device, the network device is enabled to perform the communication method in any one of the eleventh aspect or the possible implementations of the eleventh aspect.

According to a twentieth aspect, this application provides a computer program product that includes an instruction. When the computer program product runs on a terminal, the terminal is enabled to perform the communication method in any one of the twelfth aspect or the possible implementations of the twelfth aspect.

DETAILED DESCRIPTION OF ILLUSTRATIVE EMBODIMENTS

For ease of understanding, a schematic architectural diagram of a communications system capable of implementing a communication method in embodiments of this application is first described overall. It should be understood that the embodiments of this application are not limited to a system architecture shown in FIG. 1. In addition, an apparatus in FIG. 1 may be hardware, or may be function software, or a combination thereof.

Figure 1:
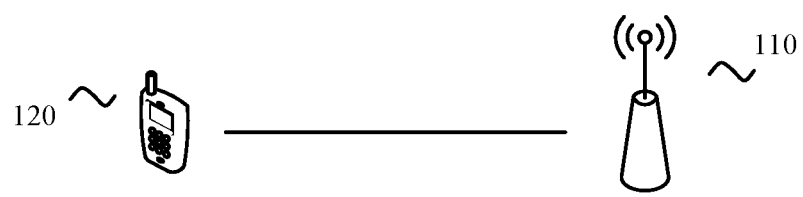
FIG. 1 is a schematic architectural diagram of a communications system to which a communication method according to an embodiment of this application may be applied.

An instance of the communications system shown in FIG. 1 is an NR communications system, such as a 5G communications system. The communications system shown in FIG. 1 may include a network device no and a terminal 120. The network device no and the terminal 120 can communicate with each other.

An example of the network device no is a base station. It should be understood that a specific type of the base station is not limited in the embodiments of this application. In systems using different radio access technologies, names of devices having a function of the base station may vary. For ease of description, in all embodiments of this application, apparatuses for providing a wireless communication function for a terminal are collectively referred to as base stations, for example, a base station device and a pico base station device in a future network.

The terminal 120 may be user equipment (UE). The UE may communicate with one or more core networks (CN) over a radio access network (RAN). The UE may be referred to as an access terminal, a terminal device, a subscriber unit, a subscriber station, a mobile station, a mobile console, a remote station, a remote terminal, a mobile device, a user terminal, a radio network device, a user agent, or a user apparatus. The UE may be a cellular phone, a cordless phone, a session initiation protocol (SIP) phone, a wireless local loop (WLL) station, a personal digital assistant (PDA), a handheld device having a wireless communication function, a computing device or another device connected to a wireless modem, an in-vehicle device, a wearable device, a terminal device in the Internet of Things or Internet of Vehicles, any form of terminal device in the future network, or the like.

Figure 2:
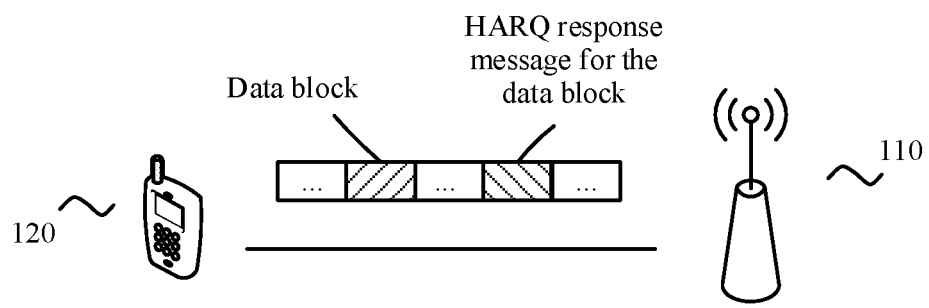
FIG. 2 is a schematic diagram of an application scenario of a communication method according to an embodiment of this application.

FIG. 2 is a schematic diagram of an application scenario according to an embodiment of this application. It should be understood that the application scenario shown in FIG. 2 is merely an example, and should not constitute a limitation on a communication method, a network device, and a terminal in this embodiment of this application.

As shown in FIG. 2, a network device no sends a data block to a terminal 120. After receiving the data block, the terminal 120 decodes the data block. An example of the data block may be a TB, a code block (CB), or a code block group (CBG).

If the decoding by the terminal 120 succeeds, it may indicate that the terminal 120 successfully receives the data block. If the decoding by the terminal 120 fails, it may indicate that the terminal 120 fails to receive the data block.

The terminal 120 may send a response message to the network device no. The response message carries an ACK and/or a NACK, to notify the network device no of whether a receiving status of the data block is succeeded or failed.

After receiving the response message, the network device no may determine, based on ACK and/or NACK information carried in the response message, whether the data block needs to be retransmitted. If the network device no determines, based on the response message, that the terminal fails to receive the data block, the network device no may retransmit the data block to the terminal 120, to improve communication reliability.

To ensure that when the terminal 120 sends the response message for the data block, the terminal 120 has completed processing, for example, has completed decoding, on the received data block, a delay needs to exist between a time at which the terminal 120 sends the response message for the data block and a time at which the terminal 120 receives the data block. For ease of subsequent description, the delay is referred to as a feedback time of the data block. The time at which the terminal 120 receives the data block may also be referred to as a receiving end time of the data block.

Because the terminal 120 may directly determine the receiving end time of the data block, the terminal 120 needs to learn of the feedback time of the data block, to determine a feedback time of the response message for the data block based on the receiving end time of the data block and the feedback time of the data block, to further feed back the receiving status of the data block.

This application proposes a new communication method for a problem about how the terminal 120 learns of the feedback time of the data block, to send a HARQ response message to feed back the receiving status of the data block.

Figure 3:
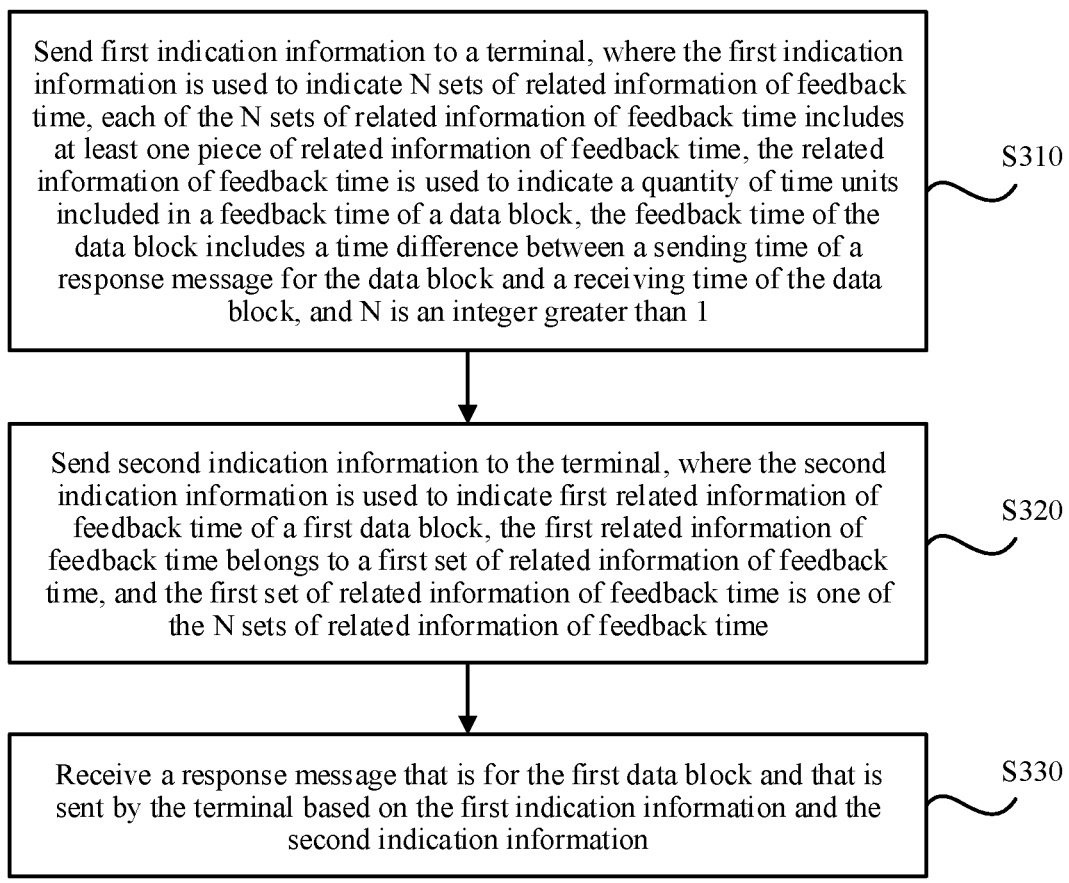
FIG. 3 is a schematic flowchart of a communication method according to an embodiment of this application.

FIG. 3 is a schematic flowchart of a communication method according to an embodiment of this application. It should be understood that FIG. 3 shows steps or operations of the communication method, but these steps or operations are merely examples. In this embodiment of this application, other operations or variations of the operations in FIG. 3 may be further performed. The communication method in this embodiment of this application may be performed by a network device, such as a network device no.

S310. Send first indication information to a terminal, where the first indication information is used to indicate N sets of related information of feedback time, each of the N sets of related information of feedback time includes at least one piece of related information of feedback time, the related information of feedback time is used to indicate a quantity of time units included in a feedback time of a data block, the feedback time of the data block includes a time difference between a sending time of a response message for the data block and a receiving time of the data block, and N is an integer greater than 1.

To be specific, the network device sends the first indication information to the terminal. The first indication information includes the N sets of related information of feedback time. Then, the terminal determines the N sets of related information of feedback time based on the first indication information. Each piece of related information of feedback time may be a value, to be specific, the quantity of time units included in the feedback time of the data block. The time unit may vary from one time domain symbol to a plurality of slots.

The response message may be a HARQ response message.

In general cases, after the terminal synchronizes with the network device, the network device may send configuration information of the N sets of related information of feedback time to the terminal, for example, send the configuration information of the N sets of related information of feedback time to the terminal by using higher layer signaling. Quantities of sets of related information of feedback time of different terminal may be different, in other words, N may be different. In addition, sets of related information of feedback time configured for different terminal may also be different, to be specific, elements in the sets are not completely the same. In addition, quantities of pieces of related information of feedback time in different sets of related information of feedback time may be different, to be specific, a set of related information of feedback time includes four elements, another set of related information of feedback time includes eight elements, and so on. For example, two sets of related information of feedback time, which are respectively {1, 2, 4, 8} and {2, 4, 8, 16}, are configured for a first terminal; and three sets of related information of feedback time, which are respectively {1, 2, 6, 8}, {2, 3, 4, 6}, and {3, 5, 7, 9, 11}, are configured for another terminal.

S320. Send second indication information to the terminal, where the second indication information is used to indicate first related information of feedback time of a first data block, the first related information of feedback time belongs to a first set of related information of feedback time, and the first set of related information of feedback time is one of the N sets of related information of feedback time.

To be specific, after configuring the N sets of related information of feedback time for the terminal, the network device may send the second indication information to the terminal to indicate the first related information of feedback time of the first data block, and send the data block (for ease of subsequent description, the data block is referred to as the first data block).

The first related information of feedback time of the first data block is used to indicate a quantity of time units included in a time difference between a sending time of a response message and a receiving time of the first data block.

The time difference between the sending time of the response message for the first data block and the receiving time of the first data block may be referred to as a feedback time of the first data block. To be specific, the first related information of feedback time is used to indicate a quantity of time units included in the feedback time of the first data block.

The network device may send the second indication information to the terminal by using downlink control information. The second indication information may be carried in the downlink control information.

Optionally, the second indication information may be specifically used to indicate a location or an index of the first related information of feedback time in the first set of related information of feedback time in the N sets of related information of feedback time.

S330. Receive the response message that is for the first data block and that is sent by the terminal based on the first indication information and the second indication information.

After receiving the second indication information, the terminal may determine, based on the first related information of feedback time, the quantity of time units included in the feedback time of the first data block.

Optionally, if the second indication information is used to indicate the location of the first related information of feedback time in the first set of related information of feedback time, the terminal may obtain the first related information of feedback time of the first data block at the corresponding location in the first set of related information of feedback time based on the second indication information, and determine, based on the first related information of feedback time, the quantity of time units included in the feedback time of the first data block.

Then, the terminal may send the response message for the first data block to the network device after the feedback time of the first data block, to be specific, after the corresponding quantity of time units, by using a receiving end time of the first data block as a start point.

Correspondingly, the network device receives the response message that is for the first data block and that is sent by the terminal based on the indication information, and performs subsequent processing based on the response message for the first data block. This can improve communication reliability.

It should be noted that the first set of related information of feedback time is one of the plurality of sets of related information of feedback time. To be specific, all related information of feedback time may be grouped into a plurality of sets of related information of feedback time. In comparison with a method in which all related information of feedback time is grouped into one total set of related information of feedback time, the first set of related information of feedback time may include a smaller quantity of pieces of related information of feedback time. For example, there are 16 pieces of related information of feedback time in total. If indication is directly performed, the second indication information requires four bits for indication. However, if the 16 pieces of related information of feedback time are grouped into four sets of related information of feedback time, the second indication information requires only two bits. In this way, when the second indication information indicates the location or the index of the first related information of feedback time in the first set of related information of feedback time, fewer bit overheads may be used. This can reduce communication overheads of the second indication information, thereby improving communication efficiency.

In this embodiment of this application, the N sets of related information of feedback time may be preconfigured in the network device. Different sets of related information of feedback time may correspond to different data block transmission scenarios.

For example, two sets of related information of feedback time may be configured in the network device for the following two data block transmission scenarios: a first data block transmission scenario, which may also be referred to as a default scenario, for example, a scenario in which impact of another data block on a feedback time of a current data block (namely, the first data block) is not considered, namely, a scenario in which a data block prior to the first data block does not affect a response for the first data block; and a second data block transmission scenario, namely, a scenario in which a transmission time length of the first data block is shorter than a transmission time length of a data block (which may be referred to as a second data block) transmitted before the first data block, and an interval between the transmission time of the first data block and that of the second data block is less than or is less than or equal to a specific time range, so that a feedback time of the first data block in the default scenario is before a feedback time of the second data block.

The two data block transmission scenarios are in a one-to-one correspondence with the two sets of related information of feedback time. Each set of related information of feedback time may include quantities of time units included in feedback times of first data blocks with different transmission time lengths in a data block transmission scenario corresponding to the set of related information of feedback time.

When sending the second indication information, the network device may first determine the first related information of feedback time. Specifically, the network device may first determine one set of related information of feedback time, namely, the first set of related information of feedback time, in the two sets of related information of feedback time based on a data block transmission scenario of the first data block; and then determine one piece of related information of feedback time, namely, the first related information of feedback time, in the first set of related information of feedback time. In this way, the location or the index of the first related information of feedback time in the first set of related information of feedback time can be sent.

It should be understood that the foregoing two data block transmission scenarios are merely an example. Specific scenarios corresponding to different sets of related information of feedback time are not limited in this embodiment of this application. This embodiment of this application is also applicable to another data block transmission scenario.

In addition, when configuring the N sets of related information of feedback time for the terminal by using the first indication information, the network device may further configure correspondences between the N sets of related information of feedback time and data block transmission scenarios.

In this way, the terminal may first determine the corresponding first set of related information of feedback time in the N sets of related information of feedback time based on a data block transmission scenario of the first data block; and then determine, as the first related information of feedback time based on the received second indication information, related information of feedback time that is in the first set of related information of feedback time and that is at a location indicated by the second indication information. Finally, the terminal may multiply a value indicated by the first related information of feedback time by a time unit corresponding to the first related information of feedback time, to obtain the feedback time of the first data block.

Certainly, alternatively, the network device may not need to configure correspondences between the N sets of related information of feedback time and data block transmission scenarios for the terminal. In this case, the network device may send third indication information to the terminal. The third indication information is used to indicate a specific set of related information of feedback time in the N sets of related information of feedback time that includes the first related information of feedback time of the first data block, to be specific, indicate the first set of related information of feedback time in the N sets of related information of feedback time.

The method in which the network device configures the correspondences between the N sets of related information of feedback time and the data block transmission scenarios is compared with a method in which the network device does not configure the correspondences between the N sets of related information of feedback time and the data block transmission scenarios, in the first method, the network device no longer needs to send the third indication information when subsequently sending the second indication information, so that overheads of the third indication information can be avoided, and communication efficiency can be further improved, and in the second method, the correspondences between the N sets of related information of feedback time and the data block transmission scenarios do not need to be stored and maintained in the terminal, so that running complexity of the terminal can be reduced.

In this embodiment of this application, optionally, in the N sets of related information of feedback time, time units included in feedback times indicated by related information of feedback time in different sets of related information of feedback time may be the same. This can further reduce complexity of the network device and the terminal.

In other words, the first related information of feedback time is used to indicate a quantity of first time units included in the feedback time of the first data block. In the N sets of related information of feedback time, second related information of feedback time in a second set of related information of feedback time is used to indicate a quantity of second time units included in a feedback time of a second data block, and the first time unit and the second time unit are a same time unit.

When the time units included in the feedback times indicated by the related information of feedback time in the different sets of related information of feedback time are the same, or in other words, when the first time unit and the second time unit are the same time unit, optionally, the same time unit may be a time unit preconfigured in a system. For example, the same time unit may be a time unit specified in a communications standard or protocol, or a time unit preconfigured by using higher layer signaling. The preconfigured time unit herein may be one or more symbols, one or more slots, one or more subframes, or the like. This can reduce the complexity of communication between the network device and the terminal.

When the time units included in the feedback times indicated by the related information of feedback time in the different sets of related information of feedback time are the same, or in other words, when the first time unit and the second time unit are the same time unit, optionally, a time length of the first time unit may be equal to the transmission time length of the first data block.

To be specific, after determining the first related information of feedback time, the terminal determines the feedback time of the first data block based on the transmission time length of the first data block, for example, by multiplying a value corresponding to the first related information of feedback time by the transmission time length of the first data block. The transmission time length of the first data block may vary from one time domain symbol to a plurality of slots, and a transmission time of the first data block may be discontinuous in time domain. In this case, the transmission time length herein is a total length of time units actually used for transmission. For example, if the first data block occupies three discontinuous time domain symbols in the time domain, a corresponding transmission time length of a first data block is a total time length of the three time domain symbols.

Optionally, in the N sets of related information of feedback time, time units included in feedback times indicated by related information of feedback time in different sets of related information of feedback time may be different. This can improve indication flexibility of the feedback time.

In other words, in the N sets of related information of feedback time, third related information of feedback time in a third set of related information of feedback time is used to indicate a quantity of third time units included in a feedback time of a third data block, and a first time unit and the third time unit are different time units. For example, in a scenario 1, a length of a time unit corresponding to the first related information of feedback time of the first data block is equal to a length of a transmission time unit of the first data block. In a scenario 2, a length of a time unit corresponding to the first related information of feedback time of the first data block is equal to a length of a transmission time unit of a second transport block.

Optionally, the time unit corresponding to the related information of feedback time in the set of related information of feedback time in the N sets of related information of feedback time may be a time unit occupied by an uplink control channel corresponding to the first data block, and the uplink control channel herein is used to transmit the response message for the first data block. For example, if the uplink control channel corresponding to the first data block occupies two time domain symbols, the time unit corresponding to the first related information of feedback time is two time domain symbols. This can improve indication flexibility of the feedback time of the data block.

Figure 4:
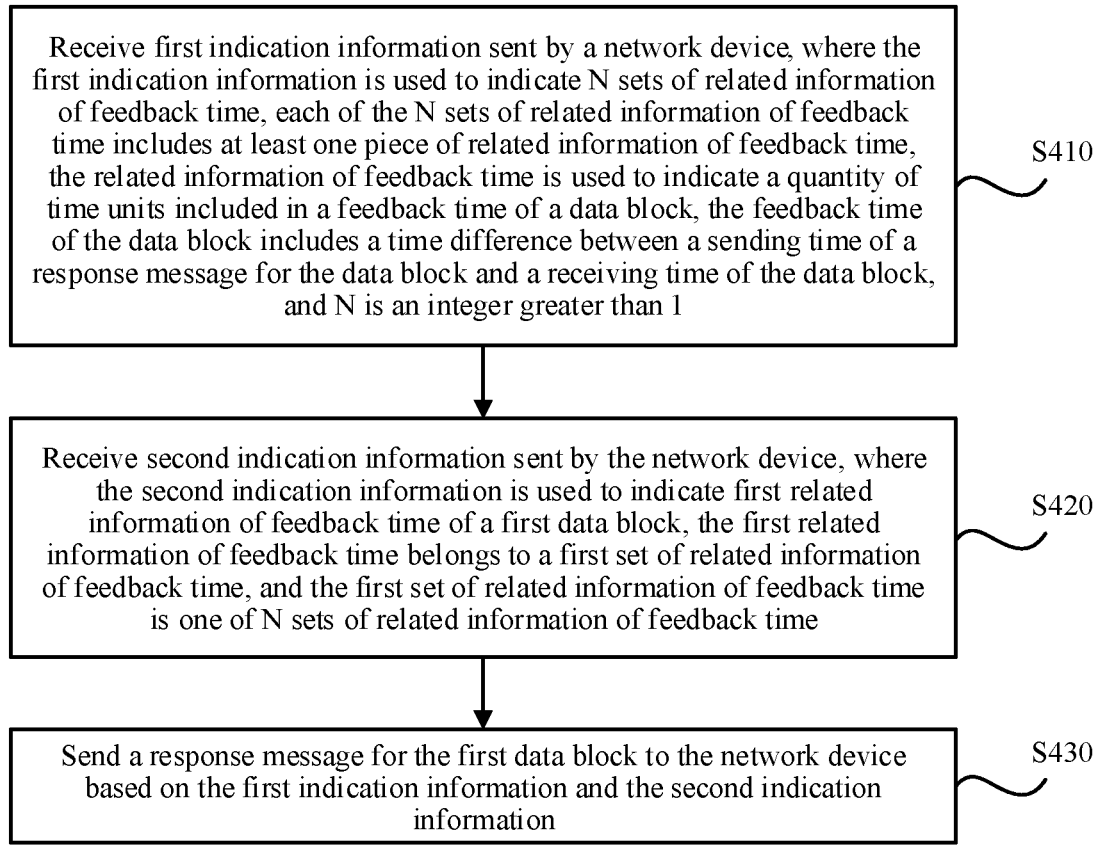
FIG. 4 is a schematic flowchart of a communication method according to another embodiment of this application.

FIG. 4 is a schematic flowchart of a communication method according to another embodiment of this application. It should be understood that FIG. 4 shows steps or operations of the communication method, but these steps or operations are merely examples. In this embodiment of this application, other operations or variations of the operations in FIG. 4 may be further performed. The communication method in this embodiment of this application may be performed by a terminal, such as a terminal 120.

S410. Receive first indication information sent by a network device, where the first indication information is used to indicate N sets of related information of feedback time, each of the N sets of related information of feedback time includes at least one piece of related information of feedback time, the related information of feedback time is used to indicate a quantity of time units included in a feedback time of a data block, the feedback time of the data block includes a time difference between a sending time of a response message for the data block and a receiving time of the data block, and N is an integer greater than 1.

The response message for the data block may be a HARQ response message for the data block.

S420. Receive second indication information sent by the network device, where the second indication information is used to indicate first related information of feedback time of a first data block, the first related information of feedback time belongs to a first set of related information of feedback time, and the first set of related information of feedback time is one of the N sets of related information of feedback time.

S430. Send a response message for the first data block to the network device based on the first indication information and the second indication information.

In the communication method, the terminal receives the second indication information from the network device, and determines the first related information of feedback time of the first data block based on the second indication information. In this way, the response message for the first data block can be sent on a feedback time corresponding to the first related information of feedback time, thereby improving communication reliability.

In addition, the second indication information indicates a location of the first related information of feedback time in one of the N sets of related information of feedback time. Therefore, fewer bits may be used in the second indication information. This can reduce signaling overheads of the second indication information, thereby improving communication efficiency.

Optionally, the terminal may further receive third indication information sent by the network device. The third indication information is used to indicate the first set of related information of feedback time in the N sets of related information of feedback time.

The communication method shown in FIG. 4 may be performed by the terminal in the communication method shown in FIG. 3. Therefore, a technical feature of the terminal in the communication method shown in FIG. 3 is also applicable to the communication method shown in FIG. 4. For brevity, details are not described herein.

Figure 5:
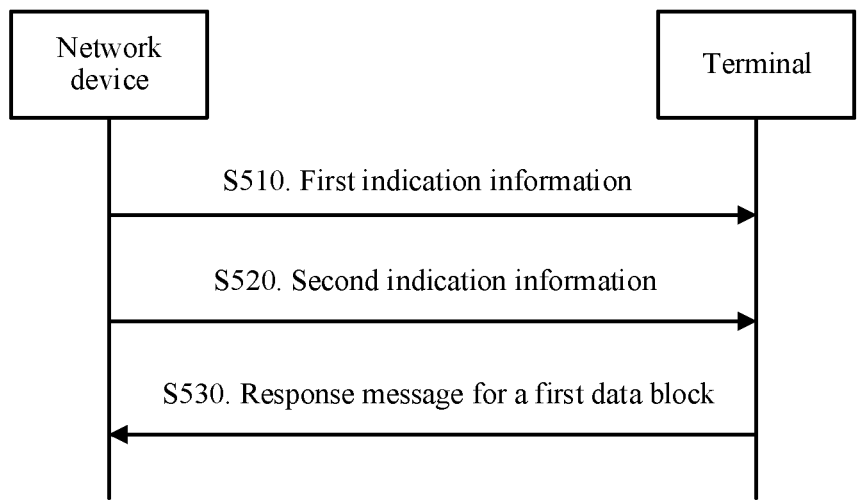
FIG. 5 is a schematic interaction flowchart of a communication method according to an embodiment of this application.

FIG. 5 is a schematic interaction flowchart of a communication method according to another embodiment of this application. It should be understood that FIG. 5 shows steps or operations of the communication method, but these steps or operations are merely examples. In this embodiment of this application, other operations or variations of the operations in FIG. 5 may be further performed.

S510. A network device sends first indication information to a terminal, where the first indication information is used to indicate N sets of related information of feedback time, each of the N sets of related information of feedback time includes at least one piece of related information of feedback time, the related information of feedback time is used to indicate a quantity of time units included in a feedback time of a data block, the feedback time of the data block includes a time difference between a sending time of a response message for the data block and a receiving time of the data block, and N is an integer greater than 1.

Correspondingly, the terminal receives the first indication information.

S520. The network device sends second indication information to the terminal, where the second indication information is used to indicate first related information of feedback time of a first data block, the first related information of feedback time belongs to a first set of related information of feedback time, and the first set of related information of feedback time is one of the plurality of sets of related information of feedback time.

Correspondingly, the terminal receives the second indication information.

S530. The terminal sends a response message for the first data block based on the first indication information and the second indication information.

Correspondingly, the network device receives the response message for the first data block.

In the communication method, the network device sends the first indication information to the terminal to indicate the N sets of related information of feedback time, and sends the second indication information to indicate the first related information of feedback time of the first data block in the first set of related information of feedback time. In this way, the terminal can determine the first related information of feedback time based on the first indication information and the second indication information, and send the response message for the first data block based on the first related information of feedback time, so that the network device determines, based on the response message, whether retransmission needs to be performed, thereby improving communication reliability.

The network device may be the network device in the communication method shown in FIG. 3. The terminal may be the terminal in the communication method shown in FIG. 3. To be specific, technical features of the network device and the terminal in the communication method shown in FIG. 3 are also applicable to the network device and the terminal in the communication method shown in FIG. 5. For brevity, details are not described herein.

The following further describes the communication method in this application in detail by using several more specific embodiments.

In a first specific embodiment, two data block transmission scenarios and two corresponding sets of related information of feedback time are configured in the network device. For the two data block transmission scenarios, refer to the data block transmission scenarios described above.

In a set of related information of feedback time corresponding to a first data block transmission scenario, a length of a time unit included in a feedback time corresponding to each piece of related information of feedback time is equal to a transmission time length of a data block corresponding to the second indication information.

In a set of related information of feedback time corresponding to a second data block transmission scenario, a time unit included in a feedback time corresponding to each piece of related information of feedback time is the same as a transmission time length of a data block prior to a data block corresponding to the second indication information.

The network device sends the two sets of related information of feedback time and correspondences between the two sets of related information of feedback time and the two data block transmission scenarios to the terminal by using the first indication information. For example, after the terminal synchronizes with the network device, the network device sends the two sets of related information of feedback time and the foregoing correspondences to the terminal by using higher layer signaling.

After receiving the two sets of related information of feedback time and the foregoing correspondences, the terminal may store the two sets of related information of feedback time and the foregoing correspondences.

When sending a first data block, the network device may determine, based on a data block transmission scenario of the first data block and a correspondence between the data block transmission scenario and a set of related information of feedback time, a set of related information of feedback time corresponding to the first data block, namely, a first set of related information of feedback time; then determine specific related information of feedback time that is in the first set of related information of feedback time and that may be used as first related information of feedback time of the first data block; determine an index of the first related information of feedback time in the first set of related information of feedback time; and send second indication information used to indicate the index.

The network device may specifically determine, based on at least one of the following types of information, the specific related information of feedback time that is in the first set of related information of feedback time and that may be used as the first related information of feedback time of the first data block: a transmission time of the first data block, a data processing capability (such as a decoding capability) of the terminal, a transmission time of a second data block prior to the first data block, a feedback time of the second data block, a transmission time of an uplink control channel corresponding to the first data block, and the like.

The network device may send downlink control information to the terminal. The downlink control information carries the second indication information.

The terminal receives the first data block and the second indication information, and determines, based on the data block transmission scenario of the first data block and the correspondence between the data block transmission scenario and the set of related information of feedback time, the first set of related information of feedback time corresponding to the first data block from N sets of related information of feedback time; and then obtains the first related information of feedback time from the first set of related information of feedback time based on the second indication information.

If the first set of related information of feedback time corresponds to the first data block transmission scenario, the terminal may obtain a feedback time of the first data block by multiplying a value corresponding to the first related information of feedback time by a transmission time length of the first data block.

After the terminal obtains the feedback time of the first data block, in a first case, if the terminal determines, based on other indication information (which may be higher layer signaling indication information or dynamic signaling indication information, or may be the first indication information or the second indication information), that a response message for the first data block is fed back together with response messages for a plurality of other data blocks, the terminal sends the response message for the first data block to the network device in the feedback time by using a receiving end time of the plurality of data blocks as a start point; or in a second case, if the terminal determines, based on other indication information, that the first data block is a redundancy version (RV) of a data block, the terminal sends a response message for the first data block to the network device in the feedback time by using a receiving end time of the correctly decoded RV as a start point; or otherwise, sends a response message for the first data block to the network device in the feedback time by using a receiving end time of the first data block as a start point.

If the first set of related information of feedback time corresponds to the second data block transmission scenario, the terminal may obtain a feedback time of the first data block by multiplying a value corresponding to the first related information of feedback time by a transmission time length of the second data block prior to the first data block.

After obtaining the feedback time of the first data block, the terminal sends a response message for the first data block to the network device in the feedback time by using a receiving end time of the first data block as a start point.

Correspondingly, the network device receives the response message that is for the first data block and that is sent by the terminal.

In a second specific embodiment, two data block transmission scenarios and two corresponding sets of related information of feedback time are configured in the network device. For the two data block transmission scenarios, refer to the data block transmission scenarios described above.

In the two sets of related information of feedback time, a time unit included in a feedback time corresponding to each piece of related information of feedback time is a time unit configured by the network device according to a communications standard or protocol. The preconfigured time unit may be one or more symbols, or one or more slots, or one or more subframes.

The network device sends the two sets of related information of feedback time and correspondences between the two sets of related information of feedback time and the two data block transmission scenarios to the terminal by using the first indication information. For example, after the terminal synchronizes with the network device, the network device sends the two sets of related information of feedback time and the foregoing correspondences to the terminal by using higher layer signaling.

After receiving the two sets of related information of feedback time and the foregoing correspondences, the terminal may store the two sets of related information of feedback time and the foregoing correspondences.

When sending a first data block, the network device may determine, based on a data block transmission scenario of the first data block and a correspondence between the data block transmission scenario and a set of related information of feedback time, a set of related information of feedback time corresponding to the first data block, namely, a first set of related information of feedback time; then determine specific related information of feedback time that is in the first set of related information of feedback time and that may be used as first related information of feedback time of the first data block; determine an index of the first related information of feedback time in the first set of related information of feedback time; and send second indication information used to indicate the index.

The network device may specifically determine, based on at least one of the following types of information, the specific related information of feedback time that is in the first set of related information of feedback time and that may be used as the first related information of feedback time of the first data block: a transmission time of the first data block, a data processing capability (such as a decoding capability) of the terminal, a transmission time of a second data block prior to the first data block, a feedback time of the second data block, a transmission time of an uplink control channel corresponding to the first data block, and the like.

The network device may send downlink control information to the terminal. The downlink control information carries the second indication information.

The terminal receives the first data block and the second indication information, and determines, based on the data block transmission scenario of the first data block and the correspondence between the data block transmission scenario and the set of related information of feedback time, the first set of related information of feedback time corresponding to the first data block from N sets of related information of feedback time; and then determines and obtains the first related information of feedback time from the first set of related information of feedback time based on the second indication information.

The terminal may obtain a feedback time of the first data block by multiplying a value corresponding to the first related information of feedback time by a time unit preconfigured in the terminal.

If the first set of related information of feedback time corresponds to a first data block transmission scenario, after the terminal obtains the feedback time of the first data block, in a first case, if the terminal determines, based on other indication information (which may be higher layer signaling indication information or dynamic signaling indication information, or may be the first indication information or the second indication information), that a response message for the first data block is fed back together with response messages for a plurality of other data blocks, the terminal sends the response message for the first data block to the network device in the feedback time by using a receiving end time of the plurality of data blocks as a start point; or in a second case, if the terminal determines, based on other indication information, that the first data block is a redundancy version (RV) of a data block, the terminal sends a response message for the first data block to the network device in the feedback time by using a receiving end time of the correctly decoded RV as a start point; or otherwise, sends a response message for the first data block to the network device in the feedback time by using a receiving end time of the first data block as a start point.

If the first set of related information of feedback time corresponds to a second data block transmission scenario, after obtaining the feedback time of the first data block, the terminal sends a response message for the first data block to the network device in the feedback time by using a receiving end time of the first data block as a start point.

After obtaining the feedback time of the first data block, the terminal sends the response message for the first data block to the network device in the feedback time by using the receiving end time of the first data block as the start point.

Correspondingly, the network device receives the response message that is for the first data block and that is sent by the terminal.

In a third specific embodiment, two data block transmission scenarios and two corresponding sets of related information of feedback time are configured in the network device. For the two data block transmission scenarios, refer to the data block transmission scenarios described above.

In the two sets of related information of feedback time, a length of a time unit included in a feedback time corresponding to each piece of related information of feedback time is equal to a transmission time length of a current data block.

The network device sends the two sets of related information of feedback time and correspondences between the two sets of related information of feedback time and the two data block transmission scenarios to the terminal by using the first indication information. For example, after the terminal synchronizes with the network device, the network device sends the two sets of related information of feedback time and the foregoing correspondences to the terminal in a broadcast manner.

After receiving the two sets of related information of feedback time and the foregoing correspondences, the terminal may store the two sets of related information of feedback time and the foregoing correspondences.

When sending a first data block, the network device may determine, based on a data block transmission scenario of the first data block and a correspondence between the data block transmission scenario and a set of related information of feedback time, a set of related information of feedback time corresponding to the first data block, namely, a first set of related information of feedback time; then determine specific related information of feedback time that is in the first set of related information of feedback time and that may be used as first related information of feedback time of the first data block; determine an index of the first related information of feedback time in the first set of related information of feedback time; and send second indication information used to indicate the index.

The network device may specifically determine, based on at least one of the following types of information, the specific related information of feedback time that is in the first set of related information of feedback time and that may be used as the first related information of feedback time of the first data block: a transmission time of the first data block, a data processing capability (such as a decoding capability) of the terminal, a transmission time of a second data block prior to the first data block, a feedback time of the second data block, a transmission time of an uplink control channel corresponding to the first data block, and the like.

The network device may send downlink control information to the terminal by using higher layer signaling. The downlink control information carries the second indication information.

The terminal receives the first data block and the second indication information, and determines, based on the data block transmission scenario of the first data block and the correspondence between the data block transmission scenario and the set of related information of feedback time, the first set of related information of feedback time corresponding to the first data block from N sets of related information of feedback time; and then determines and obtains the first related information of feedback time from the first set of related information of feedback time based on the second indication information.

The terminal may obtain a feedback time of the first data block by multiplying a value corresponding to the first related information of feedback time by a transmission time length of the first data block.

If the first set of related information of feedback time corresponds to a first data block transmission scenario, after the terminal obtains the feedback time of the first data block, in a first case, if the terminal determines, based on other indication information (which may be higher layer signaling indication information or dynamic signaling indication information, or may be the first indication information or the second indication information), that a response message for the first data block is fed back together with response messages for a plurality of other data blocks, the terminal sends the response message for the first data block to the network device in the feedback time by using a receiving end time of the plurality of data blocks as a start point; or in a second case, if the terminal determines, based on other indication information, that the first data block is a redundancy version (RV) of a data block, the terminal sends a response message for the first data block to the network device in the feedback time by using a receiving end time of the correctly decoded RV as a start point; or otherwise, sends a response message for the first data block to the network device in the feedback time by using a receiving end time of the first data block as a start point.

If the first set of related information of feedback time corresponds to a second data block transmission scenario, after obtaining the feedback time of the first data block, the terminal sends a response message for the first data block to the network device in the feedback time by using a receiving end time of the first data block as a start point.

Correspondingly, the network device receives the response message that is for the first data block and that is sent by the terminal.

In a fourth specific embodiment, two data block transmission scenarios and two corresponding sets of related information of feedback time are configured in the network device. For the two data block transmission scenarios, refer to the data block transmission scenarios described above.

In the two sets of related information of feedback time, a time unit included in a feedback time corresponding to each piece of related information of feedback time is a time unit reported by a terminal through an uplink control channel.

The network device sends the two sets of related information of feedback time and correspondences between the two sets of related information of feedback time and the two data block transmission scenarios to the terminal by using first indication information. For example, after the terminal synchronizes with the network device, the network device sends the two sets of related information of feedback time and the foregoing correspondences to the terminal in a broadcast manner.

After receiving the two sets of related information of feedback time and the foregoing correspondences, the terminal may store the two sets of related information of feedback time and the foregoing correspondences.

When sending a first data block, the network device may determine, based on a data block transmission scenario of the first data block and a correspondence between the data block transmission scenario and a set of related information of feedback time, a set of related information of feedback time corresponding to the first data block, namely, a first set of related information of feedback time; then determine specific related information of feedback time that is in the first set of related information of feedback time and that may be used as first related information of feedback time of the first data block; determine an index of the first related information of feedback time in the first set of related information of feedback time; and send second indication information used to indicate the index.

The network device may specifically determine, based on at least one of the following types of information, the specific related information of feedback time that is in the first set of related information of feedback time and that may be used as the first related information of feedback time of the first data block: a transmission time of the first data block, a data processing capability (such as a decoding capability) of the terminal, a transmission time of a second data block prior to the first data block, a feedback time of the second data block, a transmission time of an uplink control channel corresponding to the first data block, and the like.

The network device may send downlink control information to the terminal by using higher layer signaling. The downlink control information carries the second indication information.

The terminal receives the first data block and the second indication information, and determines, based on the data block transmission scenario of the first data block and the correspondence between the data block transmission scenario and the set of related information of feedback time, the first set of related information of feedback time corresponding to the first data block from N sets of related information of feedback time; and then determines and obtains the first related information of feedback time from the first set of related information of feedback time based on the second indication information.

The terminal may obtain a feedback time of the first data block by multiplying a value corresponding to the first related information of feedback time by a time unit of the uplink control channel corresponding to the first data block.

If the first set of related information of feedback time corresponds to a first data block transmission scenario, after the terminal obtains the feedback time of the first data block, in a first case, if the terminal determines, based on other indication information (which may be higher layer signaling indication information or dynamic signaling indication information, or may be the first indication information or the second indication information), that a response message for the first data block is fed back together with response messages for a plurality of other data blocks, the terminal sends the response message for the first data block to the network device in the feedback time by using a receiving end time of the plurality of data blocks as a start point; or in a second case, if the terminal determines, based on other indication information, that the first data block is a redundancy version (RV) of a data block, the terminal sends a response message for the first data block to the network device in the feedback time by using a receiving end time of the correctly decoded RV as a start point; or otherwise, sends a response message for the first data block to the network device in the feedback time by using a receiving end time of the first data block as a start point.

If the first set of related information of feedback time corresponds to a second data block transmission scenario, after obtaining the feedback time of the first data block, the terminal sends a response message for the first data block to the network device in the feedback time by using a receiving end time of the first data block as a start point.

Correspondingly, the network device receives the response message that is for the first data block and that is sent by the terminal.

In a fifth specific embodiment, two data block transmission scenarios and two corresponding sets of related information of feedback time are configured in the network device. For the two data block transmission scenarios, refer to the data block transmission scenarios described above.

In the two sets of related information of feedback time, a time unit included in a feedback time corresponding to each piece of related information of feedback time may be any one of various time units described in the foregoing four specific embodiments.

The network device sends the two sets of related information of feedback time to the terminal by using first indication information. For example, after the terminal synchronizes with the network device, the network device sends the two sets of related information of feedback time to the terminal in a broadcast manner.

The terminal receives the two sets of related information of feedback time, and may store the two sets of related information of feedback time.

When sending a first data block, the network device may determine, based on a data block transmission scenario of the first data block and a correspondence between the data block transmission scenario and a set of related information of feedback time, a set of related information of feedback time corresponding to the first data block, namely, a first set of related information of feedback time; send third indication information used to indicate the first set of related information of feedback time; determine specific related information of feedback time that is in the first set of related information of feedback time and that may be used as first related information of feedback time of the first data block; determine an index of the first related information of feedback time in the first set of related information of feedback time; and send second indication information used to indicate the index.

The network device may specifically determine, based on at least one of the following types of information, the specific related information of feedback time that is in the first set of related information of feedback time and that may be used as the first related information of feedback time of the first data block: a transmission time of the first data block, a data processing capability (such as a decoding capability) of the terminal, a transmission time of a second data block prior to the first data block, a feedback time of the second data block, a transmission time of an uplink control channel corresponding to the first data block, and the like.

The network device may send downlink control information to the terminal. The downlink control information carries the second indication information and the third indication information.

The terminal receives the first data block, the second indication information, and the third indication information, and determines the first set of related information of feedback time in the N sets of related information of feedback time based on the third indication information; and then determines the first related information of feedback time in the first set of related information of feedback time based on the second indication information.

The terminal may obtain a feedback time of the first data block by multiplying a value corresponding to the first related information of feedback time by a corresponding time unit.

After obtaining the feedback time of the first data block, the terminal sends a response message for the first data block to the network device in the feedback time by using a receiving end time of the first data block as a start point.

Correspondingly, the network device receives the response message that is for the first data block and that is sent by the terminal.

The foregoing describes the communication methods in the embodiments of this application. The following describes a network device and a terminal in the embodiments of this application.

Figure 6:
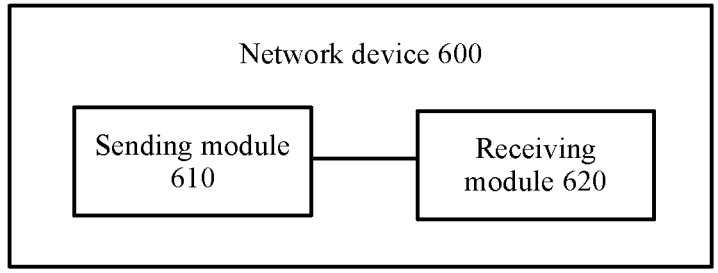
FIG. 6 is a schematic structural diagram of a network device according to an embodiment of this application.

FIG. 6 is a schematic structural diagram of a network device according to an embodiment of this application. It should be understood that a network device 600 shown in FIG. 6 is merely an example. The network device in this embodiment of this application may further include other modules or units, or include modules having functions similar to those of modules in FIG. 6, or does not necessarily need to include all modules in FIG. 6.

A sending module 610 is configured to send first indication information to a terminal, where the first indication information is used to indicate N sets of related information of feedback time, each of the N sets of related information of feedback time includes at least one piece of related information of feedback time, the related information of feedback time is used to indicate a quantity of time units included in a feedback time of a data block, the feedback time of the data block includes a time difference between a sending time of a response message for the data block and a receiving time of the data block, and N is an integer greater than 1.

The sending module 610 is further configured to send second indication information to the terminal, where the second indication information is used to indicate first related information of feedback time of a first data block, the first related information of feedback time belongs to a first set of related information of feedback time, and the first set of related information of feedback time is one of the N sets of related information of feedback time.

A receiving module 620 is configured to receive a response message that is for the first data block and that is sent by the terminal based on the first indication information and the second indication information.

The network device sends the second indication information to the terminal. The terminal may determine the first related information of feedback time based on the second indication information, and send the response message for the first data block based on the first related information of feedback time, so that communication reliability can be improved.

Optionally, the second indication information may be used to indicate a location of the first related information of feedback time of the first data block in the first set of related information of feedback time.

In this case, the first set of related information of feedback time is one of the N sets of related information of feedback time. In other words, related information of feedback time may be grouped into the N sets of related information of feedback time. Therefore, when indicating the location of the first related information of feedback time, the second indication information indicates only the location of the first related information of feedback time in the first set of related information of feedback time, so that fewer bits can be used in the second indication information. This can reduce communication overheads of the second indication information, thereby improving communication efficiency.

Optionally, in the N sets of related information of feedback time, time units corresponding to related information of feedback time in different sets of related information of feedback time may be the same.

Optionally, the time unit corresponding to the related information of feedback time in the set of related information of feedback time may be preconfigured.

Optionally, a length of the time unit corresponding to the related information of feedback time in the set of related information of feedback time may be equal to a transmission time length of the first data block.

Optionally, in the N sets of related information of feedback time, time units corresponding to related information of feedback time in different sets of related information of feedback time may be different.

Optionally, a time unit corresponding to the related information of feedback time in the set of related information of feedback time may be a time unit occupied by an uplink control channel corresponding to the first data block.

Optionally, the sending module 610 may be further configured to send third indication information to the terminal, where the third indication information is used to indicate the first set of related information of feedback time in the N sets of related information of feedback time.

The network device shown in FIG. 6 may perform the steps performed by the network device in the communication method shown in FIG. 3, to be specific, a technical feature of the network device in the communication method shown in FIG. 3 is also applicable to the network device shown in FIG. 6. For brevity, details are not described herein.

Figure 7:
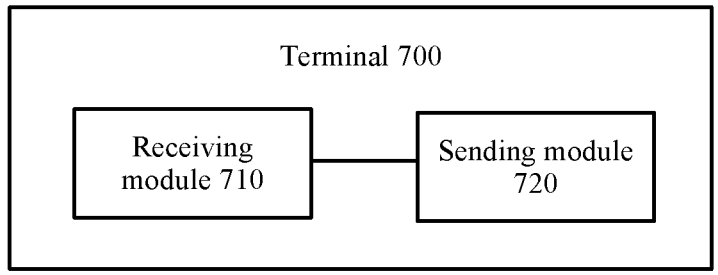
FIG. 7 is a schematic structural diagram of a terminal according to an embodiment of this application.

FIG. 7 is a schematic structural diagram of a terminal according to an embodiment of this application. It should be understood that a terminal 700 shown in FIG. 7 is merely an example. The terminal in this embodiment of this application may further include other modules or units, or include modules having functions similar to those of modules in FIG. 7, or does not necessarily need to include all modules in FIG. 7.

A receiving module 710 is configured to receive first indication information sent by a network device, where the first indication information is used to indicate N sets of related information of feedback time, each of the N sets of related information of feedback time includes at least one piece of related information of feedback time, the related information of feedback time is used to indicate a quantity of time units included in a feedback time of a data block, the feedback time of the data block includes a time difference between a sending time of a response message for the data block and a receiving time of the data block, and N is an integer greater than 1.

The receiving module 710 is further configured to receive second indication information sent by the network device, where the second indication information is used to indicate first related information of feedback time of a first data block, the first related information of feedback time belongs to a first set of related information of feedback time, and the first set of related information of feedback time is one of the N sets of related information of feedback time.

A sending module 720 is configured to send a response message for the first data block to the network device based on the first indication information and the second indication information.

After receiving the second indication information sent by the network device, the terminal may determine the first related information of feedback time in the first set of related information of feedback time based on the second indication information; and determine, based on a quantity indicated by the first related information of feedback time, a feedback time in which the terminal is to send the response message for the first data block, so that the terminal can send the response message for the first data block to the network device. This can improve communication reliability.

Optionally, the second indication information may be used to indicate a location or an index of the first related information of feedback time of the first data block in the first set of related information of feedback time.

In this way, the first set of related information of feedback time is one of the N sets of related information of feedback time, to be specific, the first set of related information of feedback time may include some related information of feedback time in the N sets of related information of feedback time. Therefore, when the second indication information indicates the location of the first related information of feedback time in the first set of related information of feedback time, a relatively small quantity of bits may be used. This can reduce communication overheads of the second indication information.

Optionally, in the N sets of related information of feedback time, time units corresponding to related information of feedback time in different sets of related information of feedback time may be the same.

Optionally, the time unit corresponding to the related information of feedback time in the set of related information of feedback time may be configured.

Optionally, a length of the time unit corresponding to the related information of feedback time in the set of related information of feedback time may be equal to a transmission time length of the first data block.

Optionally, in the N sets of related information of feedback time, time units corresponding to related information of feedback time in different sets of related information of feedback time may be different.

Optionally, a time unit corresponding to the related information of feedback time in the set of related information of feedback time may be a time unit occupied by an uplink control channel corresponding to the first data block.

Optionally, the receiving module 710 is further configured to receive third indication information sent by the network device, where the third indication information is used to indicate the first set of related information of feedback time in the N sets of related information of feedback time.

The terminal shown in FIG. 7 may perform the steps performed by the terminal in the communication method shown in FIG. 4, to be specific, a technical feature of the terminal in the communication method shown in FIG. 4 is also applicable to the terminal shown in FIG. 7. For brevity, details are not described herein.

Figure 8:
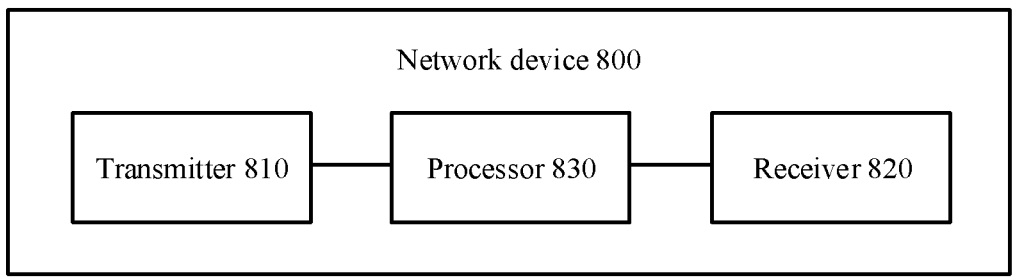
FIG. 8 is a schematic structural diagram of a network device according to another embodiment of this application.

FIG. 8 is a schematic structural diagram of a network device according to another embodiment of this application. It should be understood that a network device 800 shown in FIG. 8 is merely an example. The network device in this embodiment of this application may further include other modules or units, or include modules that have functions similar to those of modules in FIG. 8.

A processor 830 may be configured to execute program code. A transmitter 810 may be configured to implement an operation or a step that can be implemented by the sending module 610 in FIG. 6. A receiver 820 may be configured to implement an operation or a step that can be implemented by the receiving module 620 in FIG. 6.

The receiver 820 and the transmitter 810 may be integrated into a transceiver.

The network device shown in FIG. 8 may further include a memory, configured to store the program code executed by the processor. The memory may be integrated into the processor 830.

Figure 9:
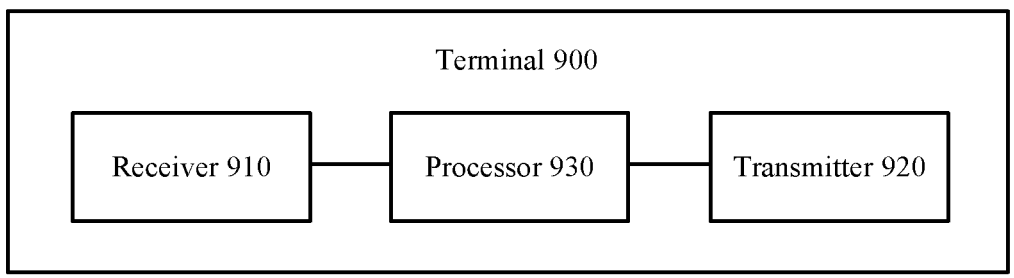
FIG. 9 is a schematic structural diagram of a terminal according to another embodiment of this application.

FIG. 9 is a schematic structural diagram of a terminal according to another embodiment of this application. It should be understood that a terminal 900 shown in FIG. 9 is merely an example. The terminal in this embodiment of this application may further include other modules or units, or include modules that have functions similar to those of modules in FIG. 9.

A processor 930 may be configured to execute program code. A receiver 910 may be configured to implement an operation or a step that can be implemented by the receiving module 710 in FIG. 7. A transmitter 920 may be configured to implement an operation or a step that can be implemented by the sending module 720 in FIG. 7.

The receiver 910 and the transmitter 920 may be integrated into a transceiver.

The terminal shown in FIG. 9 may further include a memory, configured to store the program code executed by the processor. The memory may be integrated into the processor 930.

The following describes a communication method in another embodiment of this application.

The communication method in the another embodiment of this application may include: sending first indication information to a first terminal, where the first indication information is used to indicate a first set of related information of feedback time, the first set of related information of feedback time includes at least one piece of related information of feedback time, each piece of related information of feedback time is used to indicate a quantity of time units included in a feedback time of a first data block, and the feedback time of the first data block includes a time difference between a sending time of a response message for the first data block and a receiving time of the first data block; sending second indication information to the first terminal, where the second indication information is used to indicate first related information of feedback time of the first data block, and the first related information of feedback time belongs to the first set of related information of feedback time; and receiving the response message that is for the first data block and that is sent by the first terminal based on the first indication information and the second indication information.

The communication method may be performed by a network device. To be specific, the network device may configure a set of related information of feedback time for the first terminal. In general cases, after the first terminal synchronizes with the network device, the network device may send configuration information of a set of related information of feedback time to the first terminal, for example, send configuration information of a set of related information of feedback time to the first terminal by using higher layer signaling. Each piece of related information of feedback time may be a value, to be specific, a quantity of time units included in a feedback time of a data block. The time unit may vary from one time domain symbol to a plurality of slots.

Optionally, the second indication information may be specifically used to indicate a location or an index of the first related information of feedback time of the first data block in the first set of related information of feedback time.

It should be understood that a quantity of bits included in the second indication information may be determined based on a size of the first set of related information of feedback time. It is assumed that the size of the first set of related information of feedback time is 8, to be specific, the first set of related information of feedback time includes eight pieces of first related information of feedback time. In this case, the corresponding second indication information includes at least three bits to indicate all first related information of feedback time in the first set of related information of feedback time. If the size of the first set of related information of feedback time is P, the second indication information includes at least H bits to indicate all first related information of feedback time, where H is a minimum integer greater than or equal to $\log_2 P$.

According to the communication method, the first terminal can determine, based on the first indication information and the second indication information, the time for sending the response message, so that communication reliability can be improved.

The communication method in this embodiment of this application may further include: sending third indication information to a second terminal, where the third indication information is used to indicate a second set of related information of feedback time, the second set of related information of feedback time includes at least one piece of related information of feedback time, each piece of related information of feedback time is used to indicate a quantity of time units included in a feedback time of a third data block, and the feedback time of the third data block includes a time difference between a sending time of a response message for the third data block and a receiving time of the third data block; sending fourth indication information to the second terminal, where the fourth indication information is used to indicate second related information of feedback time of the third data block, and the second related information of feedback time belongs to the second set of related information of feedback time; and receiving the response message that is for the third data block and that is sent by the second terminal based on the third indication information and the fourth indication information.

The first set of related information of feedback time may be different from the second set of related information of feedback time. Specifically, the size of the first set of related information of feedback time may be different from a size of the second set of related information of feedback time.

It should be understood that when the size of the first set of related information of feedback time is different from the size of the second set of related information of feedback time, a quantity of bits used in the second indication information is different from a quantity of bits used in the fourth indication information.

Optionally, the size of the first set of related information of feedback time may be the same as a size of the second set of related information of feedback time. In this case, at least one element in the first set of related information of feedback time may be different from at least one element in the second set of related information of feedback time.

It should be understood that when the at least one element in the first set of related information of feedback time is different from the at least one element in the second set of related information of feedback time, a quantity of bits used in the second indication information may be the same as a quantity of bits used in the fourth indication information.

In other words, sets of related information of feedback time of different terminals may include different quantities of pieces of related information of feedback time. For example, the first set of related information of feedback time configured for the first terminal may be {1, 2, 4, 8}, and the second set of related information of feedback time configured for the second terminal may be {3, 5, 7, 9, 11}. In this case, the second indication information may use two bits to indicate an index of the first related information of feedback time in the first set of related information of feedback time, and the fourth indication information may use three bits to indicate an index of the second related information of feedback time in the second set of related information of feedback time.

Sets of related information of feedback time of different terminals may include a same quantity of pieces of related information of feedback time, but there is at least one different element in the sets of related information of feedback time of the different terminals. For example, the first set of related information of feedback time configured for the first terminal may be {1, 2, 4, 8}, and the second set of related information of feedback time configured for the second terminal is {3, 5, 7, 9}. In this case, the second indication information sent to the first terminal and the fourth indication information sent to the second terminal each may use two bits to indicate indexes of the respective related information of feedback time in the respective sets of related information of feedback time.

In addition, in the communication method, in a possible implementation, the time unit included in the feedback time of the data block is determined based on a transmission time length of the data block. Because the time unit included in the feedback time of the data block is determined based on the transmission time length of the data block, and the data block may be the first data block or the third data block, feedback times of data blocks with different transmission time lengths may be indicated by using same related information of feedback time, so that the feedback times of the data blocks with different transmission time lengths can be determined by using a same set of related information of feedback time. This can reduce a quantity of to-be-transmitted sets of related information of feedback time, helping reduce transmission overheads of the first indication information. From another perspective, this can reduce a total quantity of pieces of related information of feedback time, thereby helping reduce transmission overheads of the second indication information. In conclusion, communication efficiency can be improved.

Optionally, when a transmission time length of a second data block prior to the first data block is greater than a transmission time length of the first data block, a length of a time unit included in a feedback time corresponding to the first related information of feedback time may be the transmission time length of the second data block.

Alternatively, when a transmission time length of a second data block prior to the first data block is less than or equal to a transmission time length of the first data block, a length of a time unit included in a feedback time corresponding to the first related information of feedback time may be the transmission time length of the first data block.

It should be understood that herein, that the second data block is prior to the first data block may mean that a transmission time of the second data block is before that of the first data block, and more specifically, may mean that the transmission time of the second data block is before that of the first data block, and an interval between the transmission time of the second data block and that of the first data block is less than or is less than or equal to a specific time range, so that the response message for the first data block cannot be sent by using the transmission time length of the first data block as a time unit.

Alternatively, when an interval between a transmission time of the first data block and that of the second data block is greater than or is greater than or equal to a specific time range, a length of a time unit included in a feedback time corresponding to the first related information of feedback time may be a transmission time length of the first data block.

It should be understood that in this case, the response message for the first data block and that of the second data block do not affect each other.

In the communication method, optionally, different transmission scenarios may be determined based on the transmission time length of the data block. In different transmission scenarios, sets of related information of feedback time correspond to different time units.

Specifically, when the network device transmits the data block to the terminal in the different transmission scenarios, the terminal may determine, based on a transmission scenario, a specific type of time unit corresponding to a set of related information of feedback time, and may determine the feedback time of the data block based on the first related information of feedback time indicated by the second indication information.

For a correspondence between the set of related information of feedback time and the time unit, refer to the correspondences between the different sets of related information of feedback time and the time units in the two transmission scenarios shown in FIG. 3.

In a second possible implementation, the time unit included in the feedback time of the data block is preconfigured. To be specific, the time unit included in the feedback time of the data block may be a fixed time unit preconfigured in a system or a fixed time unit predefined in a protocol. This can further reduce complexity of communication between the network device and the terminal.

In a third possible implementation, the time unit included in the feedback time of the data block is a time unit occupied by an uplink control channel corresponding to the first data block. This can improve communication flexibility.

A communication method in another embodiment of this application may include: receiving, by a first terminal, first indication information sent by a network device, where the first indication information is used to indicate a first set of related information of feedback time, the first set of related information of feedback time includes at least one piece of related information of feedback time, the related information of feedback time is used to indicate a quantity of time units included in a feedback time of a first data block, and the feedback time of the first data block includes a time difference between a sending time of a response message for the first data block and a receiving time of the first data block; receiving, by the first terminal, second indication information sent by the network device, where the second indication information is used to indicate the first related information of feedback time of the first data block, and the first related information of feedback time belongs to the first set of related information of feedback time; and sending, by the first terminal, the response message for the first data block to the network device based on the first indication information and the second indication information.

According to the communication method, the terminal can determine, based on the first indication information and the second indication information, the time for sending the response message, so that communication reliability can be improved.

The first terminal in this embodiment may be the first terminal in the foregoing embodiment, to be specific, a technical feature related to the first terminal in the foregoing embodiment is also applicable to the first terminal in this embodiment. Details are not described herein.

A communication method in another embodiment of this application may include: receiving, by a second terminal, third indication information, where the third indication information is used to indicate a second set of related information of feedback time, the second set of related information of feedback time includes at least one piece of related information of feedback time, each piece of related information of feedback time is used to indicate a quantity of time units included in a feedback time of a third data block, and the feedback time of the third data block includes a time difference between a sending time of a response message for the third data block and a receiving time of the third data block; receiving, by the second terminal, fourth indication information, where the fourth indication information is used to indicate second related information of feedback time of the third data block, and the second related information of feedback time belongs to the second set of related information of feedback time; and sending, by the second terminal, the response message for the third data block based on the third indication information and the fourth indication information.

The second set of related information of feedback time may be different from the first set of related information of feedback time in the previous embodiment. Specifically, a size of the first set of related information of feedback time may be different from a size of the second set of related information of feedback time. In this case, a quantity of bits used in the second indication information in the previous embodiment may be different from a quantity of bits used the fourth indication information.

Optionally, a size of the first set of related information of feedback time may be the same as a size of the second set of related information of feedback time. In this case, at least one element in the first set of related information of feedback time may be different from at least one element in the second set of related information of feedback time. In this case, a quantity of bits used in the second indication information is the same as a quantity of bits used in the fourth indication information.

The second terminal in this embodiment may be the second terminal in the foregoing embodiment, to be specific, a technical feature related to the second terminal in the foregoing embodiment is also applicable to the second terminal in this embodiment. Details are not described herein.

A network device in another embodiment of this application may include a sending module and a receiving module.

The sending module is configured to send first indication information to a first terminal, where the first indication information is used to indicate a first set of related information of feedback time, the first set of related information of feedback time includes at least one piece of related information of feedback time, each piece of related information of feedback time is used to indicate a quantity of time units included in a feedback time of a first data block, and the feedback time of the first data block includes a time difference between a sending time of a response message for the first data block and a receiving time of the first data block.

The sending module is further configured to send second indication information to the first terminal, where the second indication information is used to indicate first related information of feedback time of the first data block, and the first related information of feedback time belongs to the first set of related information of feedback time.

The receiving module is configured to receive the response message that is for the first data block and that is sent by the first terminal based on the second indication information and the first indication information.

According to the network device, the first terminal can determine, based on the first indication information and the second indication information, the time for sending the response message, so that communication reliability can be improved.

The sending module and the receiving module of the network device may be configured to implement the communication method in any one of the foregoing embodiments. For brevity, details are not described herein again.

A terminal in another embodiment of this application may include a sending module and a receiving module.

The receiving module is configured to receive first indication information sent by a network device, where the first indication information is used to indicate a set of related information of feedback time, the set of related information of feedback time includes at least one piece of related information of feedback time, the related information of feedback time is used to indicate a quantity of time units included in a feedback time of a data block, and the feedback time of the data block includes a time difference between a sending time of a response message for the data block and a receiving time of the data block.

The receiving module is further configured to receive second indication information sent by the network device, where the second indication information is used to indicate first related information of feedback time of a first data block, and the first related information of feedback time belongs to the first set of related information of feedback time.

The sending module is configured to send a response message for the first data block to the network device based on the second indication information.

According to the terminal, the terminal can determine, based on the first indication information and the second indication information, the time for sending the response message, so that communication reliability can be improved.

The sending module and the receiving module of the terminal may be configured to implement the communication method in the foregoing embodiments. For brevity, details are not described herein again.

A person of ordinary skill in the art may be aware that, units and algorithm steps in the examples described with reference to the embodiments disclosed in this application can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

All or some of the foregoing embodiments may be implemented through software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method comprising:
   receiving, by a terminal, first indication information from a network device, wherein the first indication information indicates N sets of information of feedback delay, each of the N sets comprises a plurality of pieces of information of feedback delay, each of the plurality of pieces of information of feedback delay indicates a quantity of time units comprised in a feedback delay of a data block received by the terminal from the network device, and the feedback delay of the data block comprises a time difference between a sending time of a response message sent by the terminal to the network device for the data block and a receiving time of the data block received by the terminal, and N is an integer greater than 1;

receiving, by the terminal, downlink control information (DCI) from the network device, wherein the DCI comprises second indication information indicating first information of feedback delay of the data block, the first information of feedback delay belongs to a first set of information of feedback delay, and the first set is one of the N sets; and sending, by the terminal, the response message for the data block to the network device based on the first indication information and the second indication information.

2. The method according to claim 1, wherein in the N sets, information of feedback delay in different sets corresponds to a same time unit.

3. The method according to claim 2, wherein the same time unit is preconfigured.

4. The method according to claim 2, wherein a length of the same time unit is equal to a transmission time length of the data block.

5. The method according to claim 1, wherein in the N sets, information of feedback delay in different sets corresponds to different time units.

6. The method according to claim 1, wherein different sets in the N sets comprise different quantities of pieces of information of feedback delay.

7. The method according to claim 1, wherein a time unit corresponding to information of feedback delay in the N sets is a time unit occupied by an uplink control channel corresponding to the data block.

8. The method according to claim 1, wherein the DCI further comprises third indication information indicating the first set in the N sets.

9. The method according to claim 1, wherein a quantity of bits comprised in the second indication information is a minimum integer greater than or equal to $\log_2 P$, P is a size of the first set.

10. The method according to claim 1, wherein the first indication information is higher layer signaling.

11. An apparatus comprising:
a non-transitory memory storage comprising instructions; and
one or more processors in communication with the memory storage, wherein the one or more processors execute the instructions to perform steps of:
receiving first indication information from a network device, wherein the first indication information indicates N sets of information of feedback delay, each of the N sets comprises a plurality of pieces of information of feedback delay, each of the plurality of pieces of information of feedback delay indicates a quantity of time units comprised in a feedback time of a data block received by the apparatus from the network device, and the feedback delay of the data block comprises a time difference between a sending time of a response message sent by the apparatus to the network device for the data block and a receiving time of the data block received by the apparatus, and N is an integer greater than 1;
receiving downlink control information (DCI) from the network device, wherein the DCI comprises second indication information indicating first information of feedback delay of the data block, the first information of feedback delay belongs to a first set of information of feedback delay, and the first set is one of the N sets; and sending the response message for the data block to the network device based on the first indication information and the second indication information.

12. The apparatus according to claim 11, wherein in the N sets, information of feedback delay in different sets corresponds to a same time unit.

13. The apparatus according to claim 12, wherein a length of the same time unit is equal to a transmission time length of the data block.

14. The apparatus according to claim 11, wherein in the N sets, information of feedback delay in different sets corresponds to different time units.

15. The apparatus according to claim 11, wherein different sets in the N sets comprise different quantities of pieces of information of feedback delay.

16. The apparatus according to claim 11, wherein a time unit corresponding to information of feedback delay in the N sets is a time unit occupied by an uplink control channel corresponding to the data block.

17. The apparatus according to claim 11, wherein the DCI further comprises third indication information indicating the first set in the N sets.

18. The apparatus according to claim 11, wherein a quantity of bits comprised in the second indication information is a minimum integer greater than or equal to $\log_2 P$, P is a size of the first set.

19. An apparatus comprising:
a non-transitory memory storage comprising instructions; and
one or more processors in communication with the memory storage, wherein the one or more processors execute the instructions to perform steps of:
sending first indication information to a terminal, wherein the first indication information indicates N sets of information of feedback delay, each of the N sets comprises a plurality of pieces of information of feedback delay, each of the plurality of pieces of information of feedback delay indicates a quantity of time units comprised in a feedback delay of a data block sent by the apparatus to the terminal, and the feedback delay of the data block comprises a time difference between a sending time of a response message sent by the terminal to the apparatus for the data block and a receiving time of the data block received by the terminal, and N is an integer greater than 1;
sending downlink control information (DCI) to the terminal, wherein the DCI comprises second indication information indicating first information of feedback delay of the data block, the first information of feedback delay belongs to a first set of information of feedback delay, and the first set is one of the N sets; and
receiving the response message for the data block from the terminal based on the first indication information and the second indication information.

20. The apparatus according to claim 19, wherein the DCI further comprises third indication information indicating the first set in the N sets.

* * * * *

UNITED STATES PATENT AND TRADEMARK OFFICE
CERTIFICATE OF CORRECTION

| | | |
|---|---|---|
| PATENT NO. | : 11,728,931 B2 | |
| APPLICATION NO. | : 17/741032 | |
| DATED | : August 15, 2023 | |
| INVENTOR(S) | : Ma et al. | |

It is certified that error appears in the above-identified patent and that said Letters Patent is hereby corrected as shown below:

In the Claims

In Column 37, in Claim 9, Line 38, delete "$\log_2 P$," and insert -- $\log_2 P$, --.

In Column 37, in Claim 11, Line 54, delete "feedback time" and insert -- feedback delay --.

In Column 38, in Claim 18, Line 30, delete "$\log_2 P$," and insert -- $\log_2 P$, --.

Signed and Sealed this
Twenty-fourth Day of October, 2023

Katherine Kelly Vidal
*Director of the United States Patent and Trademark Office*